(12) United States Patent
Huang et al.

(10) Patent No.: US 10,240,755 B2
(45) Date of Patent: Mar. 26, 2019

(54) OPTICAL LENS ASSEMBLY AND ILLUMINATION DEVICE COMPRISING THE SAME

(71) Applicant: Chun Kuang Optics Corp., Hsinchu County (TW)

(72) Inventors: Hsin-Chieh Huang, Hsinchu County (TW); Shun Wang, Hsinchu County (TW); Shun-Wen Teng, Hsinchu County (TW)

(73) Assignee: CHUN KUANG OPTICS CORP., Hsinchu County (TW)

( * ) Notice: Subject to any disclaimer, the term of this patent is extended or adjusted under 35 U.S.C. 154(b) by 276 days.

(21) Appl. No.: 15/332,141

(22) Filed: Oct. 24, 2016

(65) Prior Publication Data

US 2018/0058666 A1 Mar. 1, 2018

(30) Foreign Application Priority Data

Aug. 29, 2016 (TW) .............................. 105213171 U

(51) Int. Cl.
*F21V 5/00* (2018.01)
*F21V 17/02* (2006.01)
(Continued)

(52) U.S. Cl.
CPC .............. *F21V 17/02* (2013.01); *F21V 5/008* (2013.01); *F21V 5/04* (2013.01); *F21V 7/0091* (2013.01);
(Continued)

(58) Field of Classification Search
CPC . F21V 17/02; F21V 5/008; F21V 5/04; F21V 7/0091; F21V 7/04; F21V 14/06;
(Continued)

(56) References Cited

U.S. PATENT DOCUMENTS 7,473,007 B1\* 1/2009 Wang ...................... F21L 4/027
362/187
2005/0152153 A1 7/2005 Amano
(Continued)

FOREIGN PATENT DOCUMENTS

CN 205244911 U 5/2016
EP 3067945 A 9/2016
(Continued)

*Primary Examiner* — Bao Q Truong
(74) *Attorney, Agent, or Firm* — Li & Cai Intellectual Property(USA) Office

(57) ABSTRACT

An illumination device and the optical lens assembly thereof are provided. The illumination device includes the optical lens assembly, a light source and a driving device. The optical lens assembly includes an inner lens and an outer lens. The inner lens has a reflector having a light emission portion and a light incidence portion. An accommodating space is formed in the reflector adjacent to the light incident portion. The outer lens has a light guiding column and an outer light emission portion connected to the top of the light guiding column. The outer lens is disposed at a side of the inner lens, the light guiding column corresponds to the accommodating space, the outer light emission portion corresponds to the light emission portion. The driving device enables the outer and inner lenses to move toward or away from each other. The guiding column moves relative to the accommodating space.

13 Claims, 14 Drawing Sheets

(51) Int. Cl.
*F21V 14/06* (2006.01)
*G02B 19/00* (2006.01)
*F21V 5/04* (2006.01)
*F21V 7/00* (2006.01)
*F21V 7/04* (2006.01)

(52) U.S. Cl.
CPC ................ F21V 7/04 (2013.01); F21V 14/06 (2013.01); G02B 19/0028 (2013.01)

(58) Field of Classification Search
CPC .......... F21V 5/00; F21V 13/04; F21V 13/045; F21V 14/065; G02B 19/0028
See application file for complete search history.

(56) References Cited

U.S. PATENT DOCUMENTS

| | | | |
|---|---|---|---|
| 2006/0158887 A1 | 7/2006 | Holder et al. | |
| 2011/0122617 A1* | 5/2011 | Frey | B29C 65/567 |
| | | | 362/235 |
| 2012/0218765 A1* | 8/2012 | Inoue | F21V 13/04 |
| | | | 362/308 |
| 2014/0233242 A1* | 8/2014 | Koo | F21V 5/04 |
| | | | 362/308 |
| 2015/0062917 A1* | 3/2015 | Yin | F21V 13/04 |
| | | | 362/309 |
| 2016/0061389 A1* | 3/2016 | Dong | F21V 13/04 |
| | | | 362/297 |
| 2016/0230953 A1* | 8/2016 | Wang | F21V 5/04 |

FOREIGN PATENT DOCUMENTS

| | | |
|---|---|---|
| JP | 60-129779 A | 7/1985 |
| JP | 2004-126422 A | 4/2004 |
| JP | 2006-286615 A | 10/2006 |
| JP | 2010-092700 A | 4/2010 |
| JP | 2011-175817 A | 9/2011 |
| JP | 2011-253658 A | 12/2011 |
| JP | 2014110121 A | 6/2014 |
| JP | 2016-4705 A | 1/2016 |

* cited by examiner

OPTICAL LENS ASSEMBLY AND ILLUMINATION DEVICE COMPRISING THE SAME

BACKGROUND

1. Technical Field

The instant disclosure relates to an optical lens assembly and an illumination device comprising the same, in particular, to an optical lens assembly having two optical lenses for adjusting the light pattern produced by the light source of the illumination device.

2. Description of Related Art

The developments regarding improvements of the light emitting efficiency of light emitting diodes (LED) have become highly refined in recent years. In order to obtain maximum intensity of illumination and maximum lumen value of an LED under minimum energy consumption, the technical fields regarding heat dissipation materials, back light ink or packaging techniques have become well developed.

Based on optical analysis, the inventor of the instant disclosure develops various illumination lenses for an LED which assists the LED to obtain maximum light extracting efficiency and maximum luminous flux, thereby achieving optimum illumination efficiency.

In general, in view of the need to change the light pattern for adapting to different illumination occasions or objects to be illuminated, the illumination devices in the existing art need to change the luminaire to produce different illumination light patterns. However, such procedures are costly and inconvenient.

SUMMARY

The embodiments of the instant disclosure provide an optical lens assembly and an illumination device comprising the same which provide an inner lens and an outer lens configured to move relative to the inner lens for directly adjusting the light pattern of the illumination device, thereby solving the problems related to changing luminaires for changing illumination light patterns.

In order to achieve the object above, an embodiment of the instant disclosure provides an optical lens assembly comprising an inner lens and an outer lens. The inner lens has a reflector, the reflector has a light emission portion and a light incidence portion, and an accommodating space is formed in the reflector and adjacent to the light incidence portion. The outer lens has a light guiding column and an outer light emission portion connected to a top end of the light guiding column, the outer lens is disposed at a side of the inner lens, in which the light guiding column corresponds to the accommodating space and is disposed in the accommodating space, and the outer light emission portion corresponds to the light emission portion and covers the light emission portion. The outer lens and the inner lens are configured to move toward or move away from each other, and the light guiding column is configured to move relative to the inner lens in the accommodating space.

In order to achieve the object above, an embodiment of the instant disclosure further provides an optical lens assembly comprising an optical component and an outer lens. The optical component has a reflector, the reflector has a light emission portion and a light incidence portion, and an accommodating space is formed in the reflector and adjacent to the light incidence portion. The outer lens has a light guiding column and an outer light emission portion connected to a top end of the guiding column, the outer lens is disposed at a side of the optical component, in which the light guiding column corresponds to the accommodating space and is disposed in the accommodating space, and the outer light emission portion corresponds to the light emission portion and covers the light emission portion. The outer lens and the optical component are configured to move toward or move away from each other, and the light guiding column is configured to move relative to the optical component in the accommodating space.

In order to achieve the object above, an embodiment of the instant disclosure further provides an illumination device comprising an optical component, an outer lens, a light source and a driving device. The optical component has a reflector, the reflector has a light emission portion and a light incidence portion, and an accommodating space is formed in the reflector and adjacent to the light incidence portion. The outer lens has a light guiding column and an outer light emission portion connected to a top end of the light guiding column, the outer lens is disposed at a side of the optical component, in which the light guiding column corresponds to the accommodating space and is disposed in the accommodating space, and the outer light emission portion corresponds to the light emission portion and covers the light emission portion. The outer lens and the optical component are configured to move toward or move away from each other, and the light guiding column is configured to move relative to the optical component in the accommodating space. The light source is disposed adjacent to the light incidence portion, and the driving device is configured to move the outer lens for changing a distance between the outer lens and the optical component.

In order to achieve the object above, an embodiment of the instant disclosure further provides an illumination device comprising an inner lens, an outer lens, a light source and a driving device. The inner lens has a reflector, the reflector has a light emission portion and a light incidence portion, and an accommodating space is formed in the reflector and adjacent to the light incidence portion. The outer lens has a light guiding column and an outer light emission portion connected to a top end of the guiding column, the outer lens being disposed at a side of the inner lens, wherein the light guiding column corresponds to the accommodating space and is disposed in the accommodating space, and the outer light emission portion corresponds to the light emission portion and covers the light emission portion, in which the outer lens and the inner lens are configured to move toward or move away from each other, and the light guiding column is configured to move relative to the inner lens in the accommodating space. The light source is disposed adjacent to the light incident portion, and the driving device is configured to move the outer lens for changing a distance between the outer lens and the inner lens.

The advantage of the instant disclosure resides in that the user can change the light pattern produced by the light source passing through the optical lens assembly or the illumination device by simply changing the distance between the outer lens and the inner lens (optical component).

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
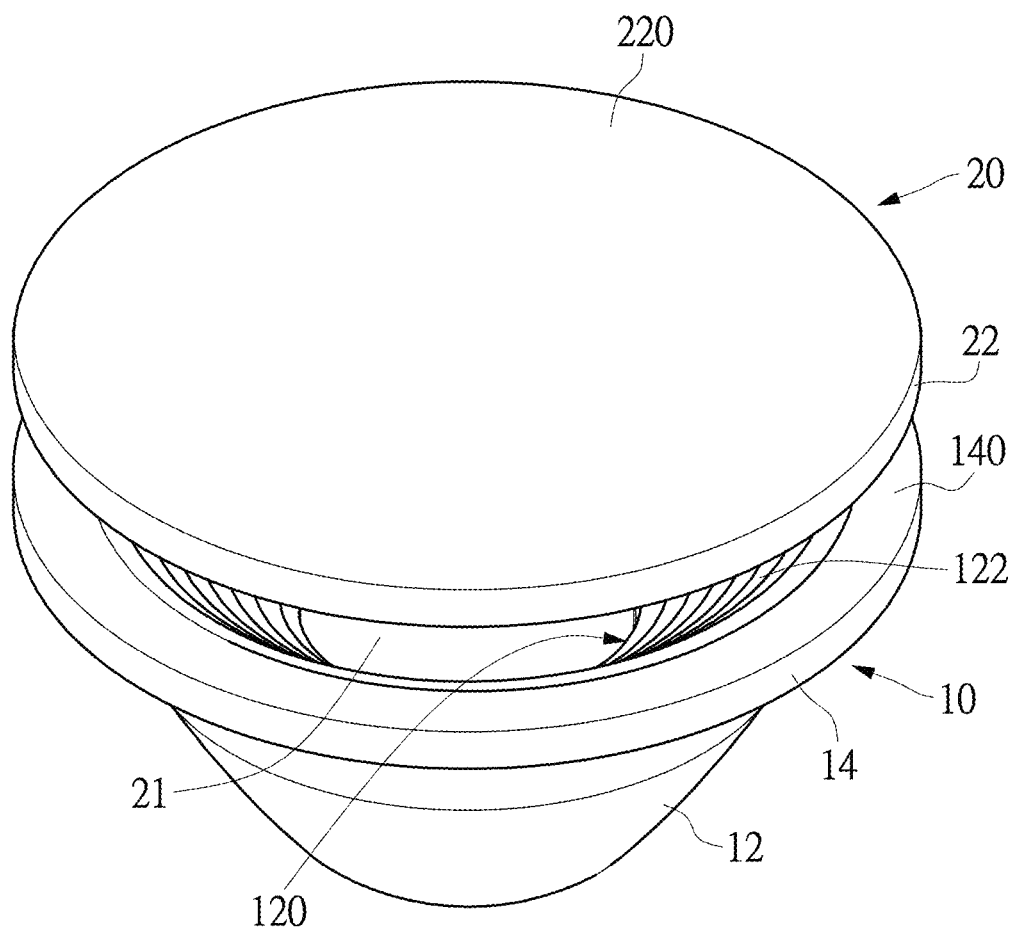
FIG. 1 is a three-dimensional assembly view of the optical lens assembly of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
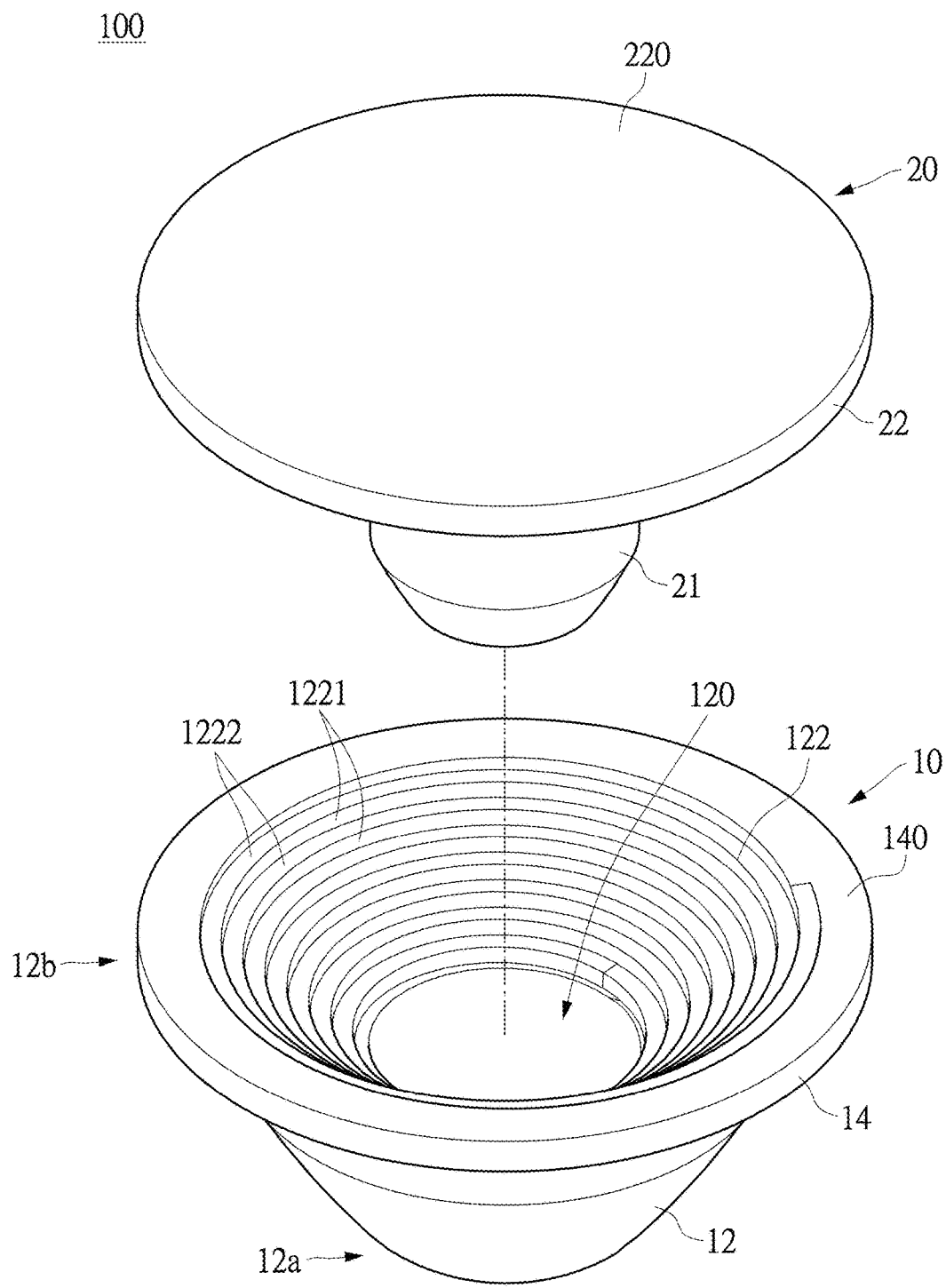
FIG. 2 is a three-dimensional exploded view of the optical lens assembly of the instant disclosure.

Please refer to FIG. 1 and FIG. 2. FIG. 1 and FIG. 2 are the three-dimensional assembly view and the three-dimensional exploded view of the optical lens assembly of the instant disclosure respectively. The instant disclosure provides an optical lens assembly 100 which can adjust the light pattern. The optical lens assembly 100 comprises an inner lens 10 and an outer lens 20. The inner lens 10 and the outer lens 20 are one-piece single translucent components or transparent components. For example, the inner lens 10 and the outer lens 20 can be formed by plastic, glass, silicone or other translucent materials. In the examples described below, the optical lens assembly 100 comprises the inner lens 10 and the outer lens 20, but in actual application, the inner lens 10 can be an optical component with reflective material.

Figure 3:
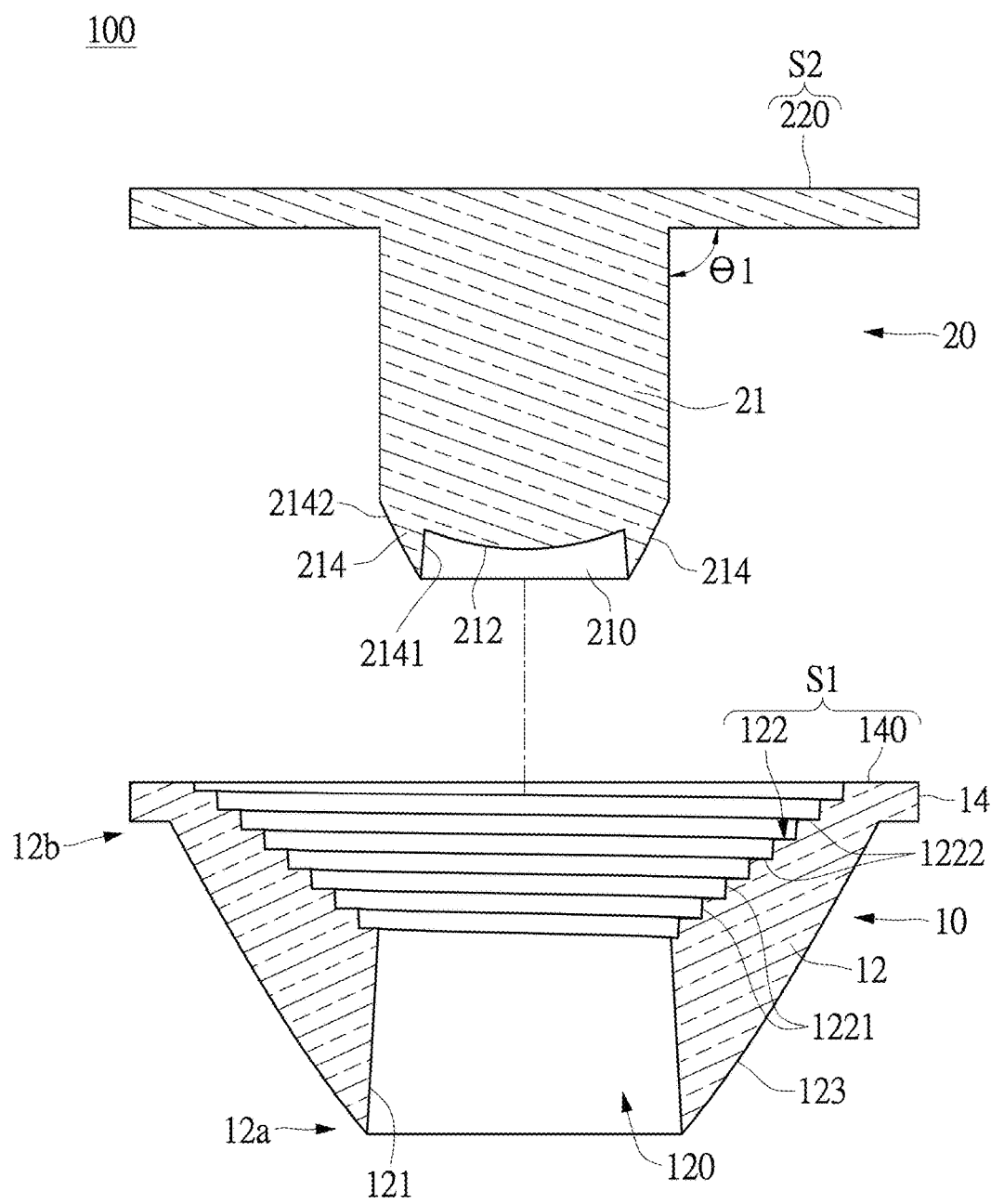
FIG. 3 is a sectional view of the optical lens assembly shown in FIG. 2.

The inner lens 10 has a reflector 12. The two ends of the reflector 12 define a light incidence portion 12a and a light emission portion 12b respectively, and a through hole 120 is formed in the reflector 12 and adjacent to the light incidence portion 12a, the through hole 120 penetrates the reflector 12, and forms an accommodating space in the reflector 12. The through hole 120 of the present embodiment is formed at the central portion of the reflector 12, and the shape of the through hole 120 can be circular via penetrating the lower half-portion of the reflector 12. The inner lens 10 forms a first light emission surface S1 (as shown in FIG. 3).

In addition, the reflector 12 forms a circular light incidence surface 121 at the inner side of the through hole 120. The outer surface of the reflector 12 has an arc surface 123, the arc surface 123 forms a total reflection surface. The arc surface 123 condenses light from the inner side of the through hole 120 (the light incidence surface 121). The top end of the reflector 12 extends outwardly to form a circular light output portion 14, the top surface of the circular light output portion 14 forms a circular light output surface 140. The circular light output surface 140 can be a flat surface, a convex surface or a concave surface. As shown in FIG. 2, the circular light output surface 140 of the present embodiment is a flat surface. However, the instant disclosure is not limited thereto. The circular light output surface 140 can be considered as a part of the first light emission surface S1.

As shown in FIG. 2, the inner side of the reflector 12 has a plurality of step-shaped inner light emission portions 122, the inner light emission portions 122 are located at the upper half-portion of the reflector 12. The inner light emission portions 122 extend from the inner edge of the circular light output portion 14 towards the top edge of the through hole 120. The inner light emission portions 122 of the present embodiment have a plurality of light emission surfaces 1222 and a plurality of reflective surfaces 1221, each reflecting surface 1221 is substantially parallel to a light guiding column 21. Each light emission surface 1222 inclines relative to the circular light output surface 140, or is substantially parallel to the circular light output surface 140. The light emission surfaces 1222 are flat surfaces, convex surfaces or concave surfaces. In the present embodiment, light from the inner side of the through hole 120 is reflected by the arc surface 123 and emits toward the inner light emission portions 122 and the circular light output portion 14. The plurality of light emission surfaces 1222 are parts of the first light emission surface S1. In other embodiments, the circular light output portion 14 can be omitted and under this condition, the plurality of light emission surfaces 1222 can be considered as the first light emission surface S1.

The inner light emission portions 122 of the present embodiment are extended spirally upwardly or downwardly, for example, extending from the inner edge of the circular light output portion 14 toward the top edge of the through hole 120. Therefore, the light emission surfaces 1222 are slightly inclined relative to the circular light output surface 140. However, the instant disclosure is not limited thereto. For example, the inner light emission portions 122 can form a structure comprising concentric circles.

Figure 4:
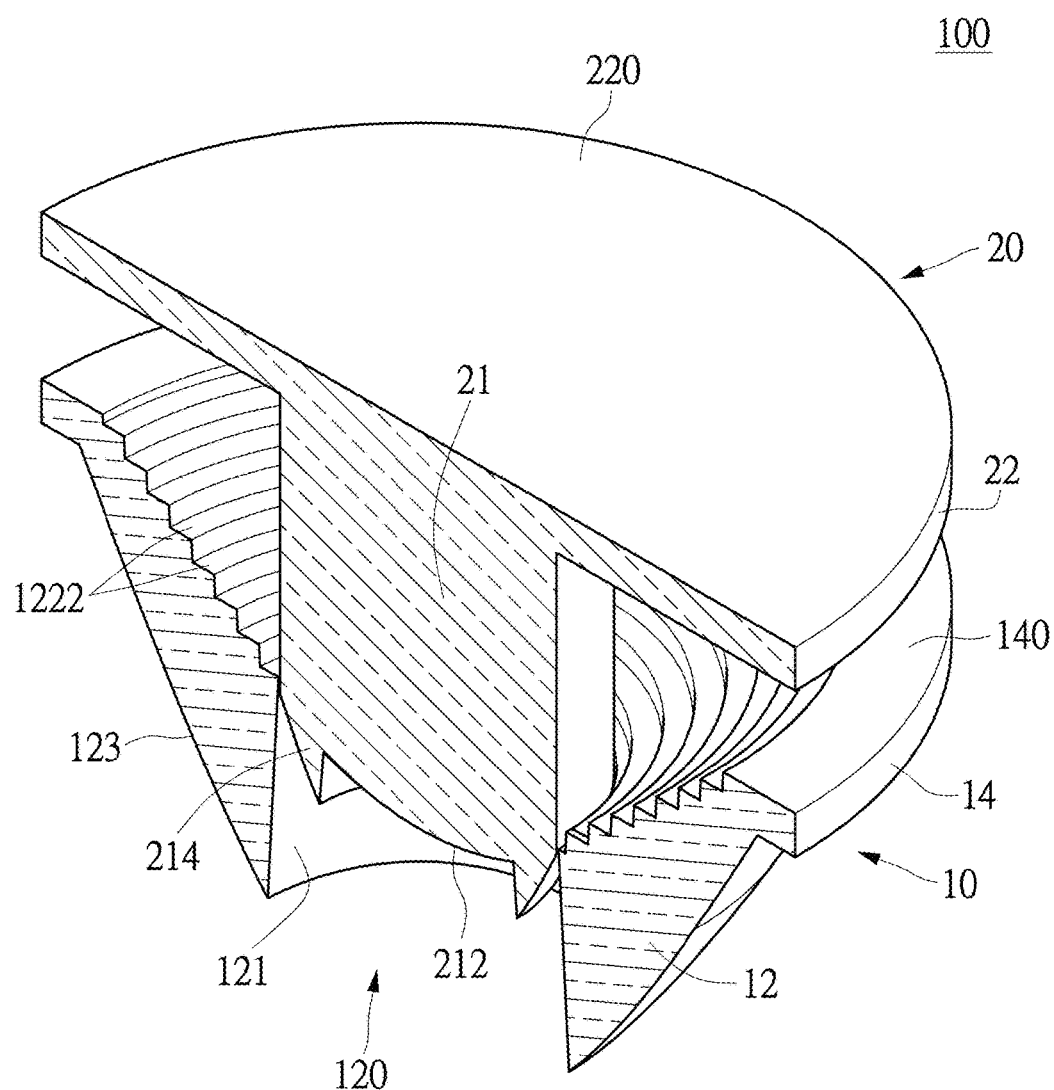
FIG. 4 is a three-dimensional sectional view of the optical lens assembly shown in FIG. 1.

Please refer to FIG. 2 and FIG. 4. The outer lens 20 has a light guiding column 21 and an outer light emission portion 22 connected to the top end of the light guiding column 21. The outer lens 20 is correspondingly disposed at a side of the inner lens 10, and the light guiding column 21 of the outer lens 20 corresponds to the through hole 120 (the accommodating space) and is disposed in the through hole 120. The outer light emission portion 22 of the outer lens 20 corresponds to the light emission portion 12b of the reflector 12 and covers the light emission portion 12b of the reflector 12. When the outer lens 20 moves relative to the inner lens 10, the light guiding column 21 moves in the through hole 120 (the accommodating space). In the present embodiment, the outer light emission portion 22 has a flat top surface 220, the top surface 220 can be referred to as the second light emission surface S2. In other embodiments, the top surface 220 can be a convex surface or a concave surface, or the top surface 220 can have microstructures formed thereon.

The light guiding column 21 of the present embodiment is a circular cylinder. However, the instant disclosure is not limited thereto. The light guiding column 21 can be a truncated cone. The outer light emission portion 22 is substantially disc-shaped, and the light guiding column 21 is substantially located at the center of the bottom surface of the outer light emission portion 22.

In the present embodiment, the luminous flux is changed by moving the outer lens 20 to move the light guiding column 21 in the through hole 120 (the accommodating space) of the inner lens 10. When the outer lens 20 and the inner lens 10 are close to each other, light emitted by the light source mostly enters into the light guiding column 21 of the outer lens 20, and most of light emitted from the second light emission surface S2 by the light guiding column 21 is in a narrower range. When the outer lens 20 and the inner lens 10 are relatively far from each other, light emitted by the light source mostly enters into the light incidence portion 12a of the inner lens 10, and most of light is emitted from the inner light emission portion 122 of the reflector 12 and the circular light output portion 14.

Please refer to FIG. 3 and FIG. 4. FIG. 3 is a sectional view of the optical lens assembly shown in FIG. 2; and FIG. 4 is a three-dimensional sectional view of the optical lens assembly shown in FIG. 1. The bottom end of the light guiding column 21 is concaved to form a light condensing groove 210, the light condensing groove 210 has a side wall defined as a circular portion 214 and a bottom wall of the light condensing groove 210 is defined as a convex portion 212. The convex portion 212 is surrounded by the circular portion 214. The convex portion 212 is a convex lens. Light can enter the light guiding column 21 through the convex portion 212.

The circular portion 214 has an inner wall surface 2141 and an outer wall surface 2142. The 2142 converges toward the bottom end of the light guiding column 21 and forms a total reflection surface, the inner wall surface 2141 can be a circular cone surface, and the diameter of the inner wall surface 2141 becomes larger from the convex portion 212 towards the bottom edge of the circular portion 214. Light can enter the circular portion 214 from the inner wall surface 2141 and is reflected by the total reflection of the outer wall surface 2142, then is emitted along the light guiding column 21. The inner wall surface 2141 is parallel to the direction of the light guiding column 21 or an included angle is defined between the inner wall surface 2141 and the light guiding column 21.

As shown in FIG. 3, the plurality of light emission surfaces 1222 of the inner light emission portions 122 and the circular light output surface 140 of the circular light output portion 14 are located under the bottom surface of the outer light emission portion 22 of the outer lens 20. As shown in FIG. 4, when the outer lens 20 is disposed at one side of the inner lens 10 and the outer lens 20 and the inner lens 10 have a relatively large distance therebetween, most of light emitted by the light source disposed correspondingly to the light incidence portion 12a enters the optical lens assembly 100 through the light incidence surface 121 of the reflector 12. Light than emits upwardly to pass through the plurality of light emission surfaces 1222 and is emitted from the circular light output surface 140. Afterward, light passes through the bottom surface of the outer light emission portion 22 and is emitted outwardly, thereby forming a smaller light pattern. In contrast thereto, when the distance between the outer lens 20 and the inner lens 10 becomes smaller (i.e., the user moves the outer lens 20 towards the inner lens 10), most of light emitted by the light source enters the light guiding column 21 and is emitted outwardly through the top surface 220, thereby forming a larger light pattern. In other words, the optical lens assembly 100 of the instant disclosure enables the user to change the size of the light pattern produced by the optical lens assembly 100 by adjusting the distance between the outer lens 20 and the inner lens 10.

Figure 5:
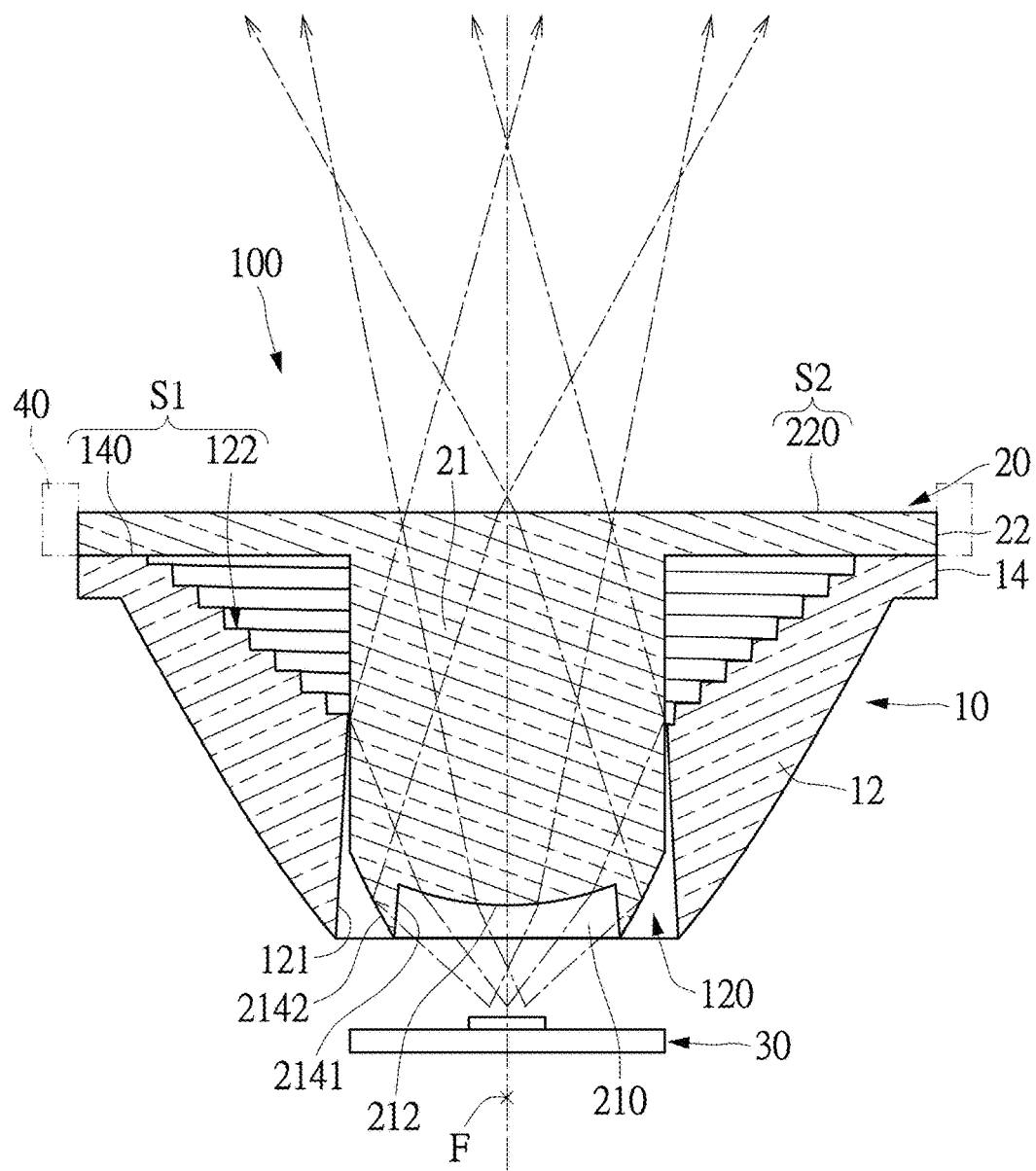
FIG. 5 is a sectional view of the illumination device of the instant disclosure under a first state.

Please refer to FIG. 5. FIG. 5 is a sectional view of the illumination device of the instant disclosure under the first state. The illumination device comprises the optical lens assembly 100, the light source 30 and the driving device 40. The light source 30 is disposed under the through hole 120. The light source 30 can be a light emitting diode. The driving device 40 is used for moving the outer lens 20 to change the distance between the outer lens 20 and the inner lens 10. Under the first state, the outer light emission portion 22 of the outer lens 20 abuts the circular light output portion 14 of the inner lens 10. The bottom surface of the outer light emission portion 22 and the top surface of the circular light output portion 14 (i.e., the circular light output surface 140) do not have a gap therebetween. Most light from the light source 30 enters the outer lens 20 from the light condensing groove 210 of the light guiding column 21, and a very small part of the light enters the inner lens 10. Specifically, the optical lens assembly 100 comprised in the illumination device comprises an inner lens 10 which is an optical component with a reflective material.

In addition, the focal length of the convex portion 212 of the present embodiment is substantially equal to the height of the through hole 120. The light source 30 is disposed at a position relative to the inner lens 10 which is not corresponding to the focus point F of the convex portion 212.

Figure 6:
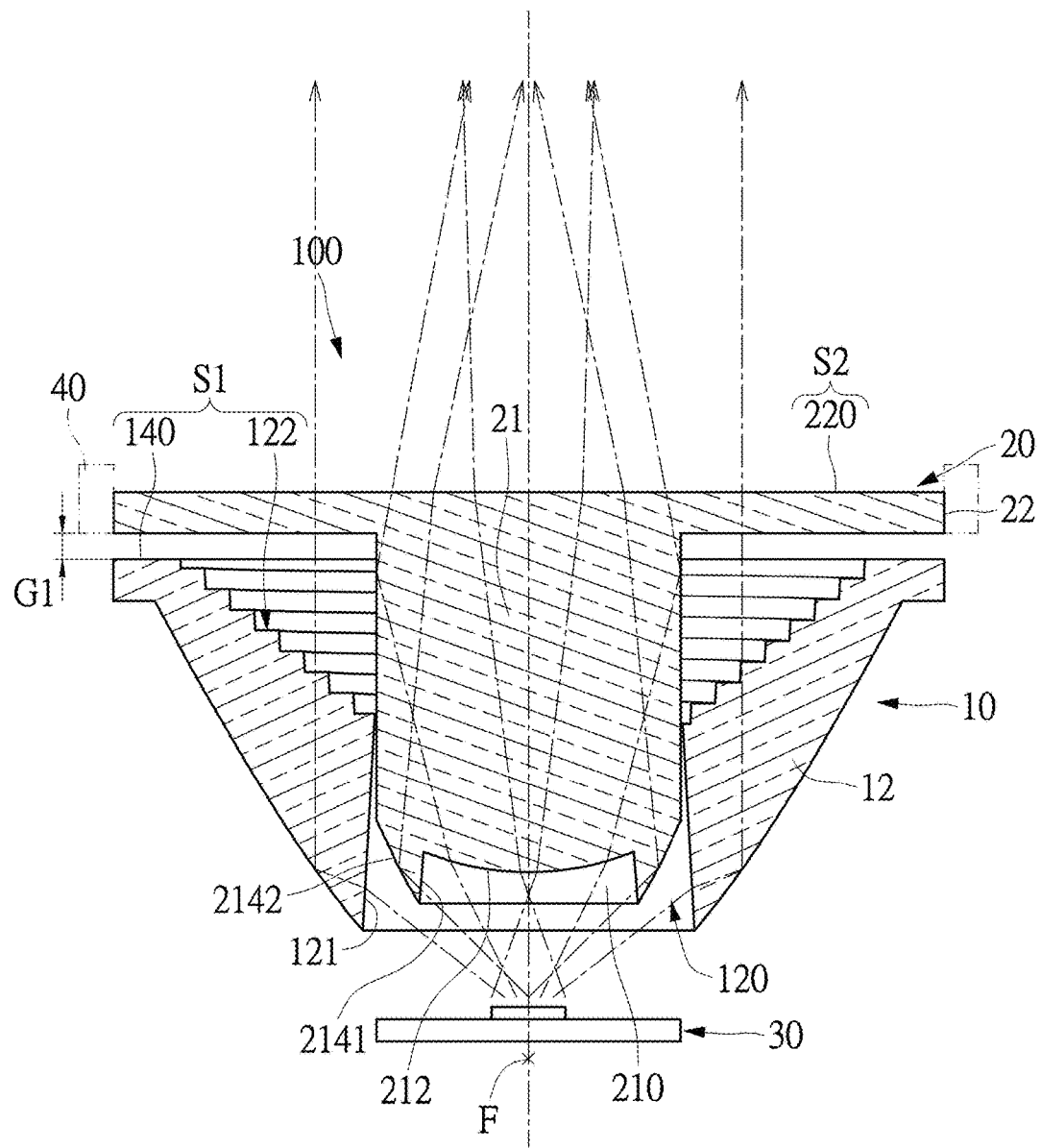
FIG. 6 is a sectional view of the illumination device of the instant disclosure under a second state.

Please refer to FIG. 6. FIG. 6 is a sectional view of the illumination device of the instant disclosure under the second state. Under the second state, the outer light emission portion 22 of the outer lens 20 is slightly apart from the circular light output portion 14 of the inner lens 10. The bottom surface of the outer light emission portion 22 and the top surface of the circular light output portion 14 (i.e., the circular light output surface 140) have a gap G1 therebetween. The light of the light source 30 mostly enters the outer lens 20 through the light condensing groove 210 of the light guiding column 21, and the amount of light entering the inner lens 10 is larger than that of FIG. 5.

The light condensing focus point of the convex portion 212 still is in excess of the bottom end of the reflector 12 and under the light source 30. However, compared to FIG. 5, the light focus point of the convex portion 212 in FIG. 6 is nearer to the light source 30. Therefore, the amount of light from the light condensing groove 210 which is diverged by the convex portion 212 is reduced and hence, compared to FIG. 5, light is more condensed and the size of light pattern is reduced since the divergence of light is reduced.

Figure 7:
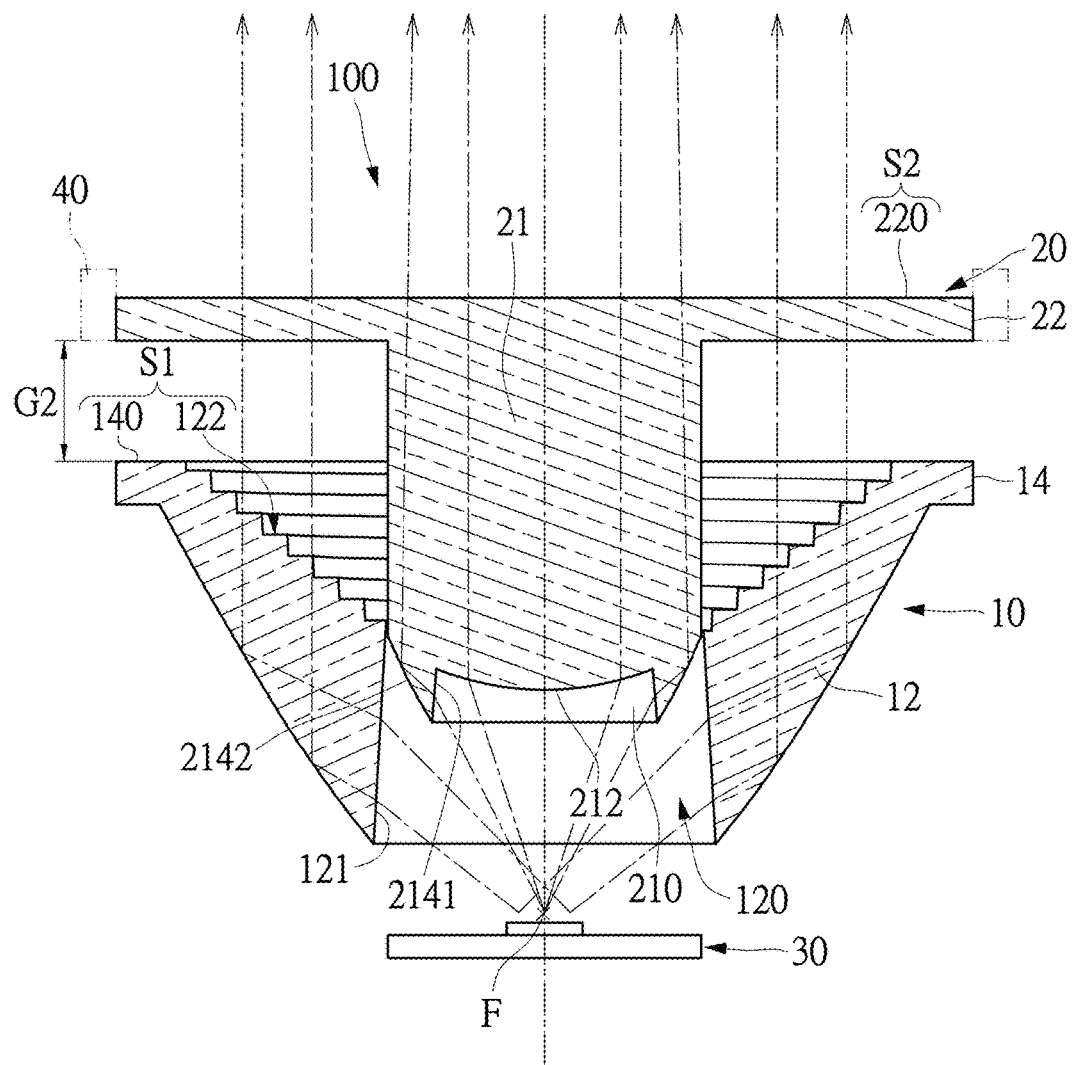
FIG. 7 is a sectional view of the illumination device of the instant disclosure under a third state.

Please refer to FIG. 7. FIG. 7 is a sectional view of the illumination device of the instant disclosure under the third state. Under the third state, the outer light emission portion 22 of the outer lens 20 is more apart from the circular light output portion 14 of the inner lens 10. The bottom surface of the outer light emission portion 22 and the top surface of the circular light output portion 14 (i.e., the circular light output surface 140) have a gap G2 therebetween. A small part of light of light source 30 enters the outer lens 20 from the light condensing groove 210 of the light guiding column 21, and more light enters the inner lens 10 from the light incidence surface 121 of the reflector 12.

Compared to the previous state, the light condensing focus point of the convex portion 212 is relatively close to the light source 30. Light from the light condensing groove 210 is further condensed by the convex portion 212. Light transmits outwardly by passing the light guiding column 21 of the outer lens 20 in a direction substantially parallel to the light guiding column 21. Therefore, the irradiance intensity in the center of the illumination device is increased.

Figure 5A:
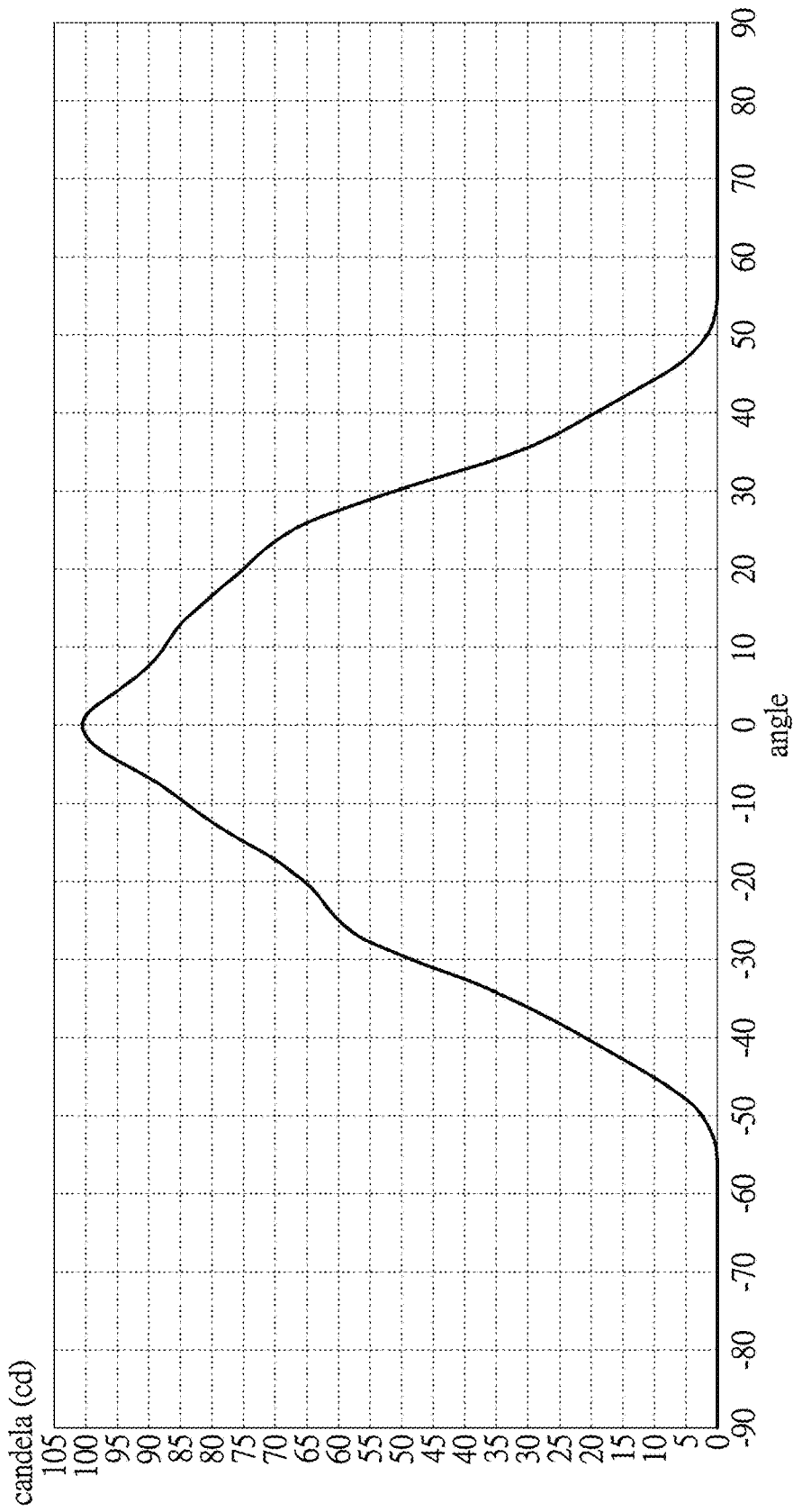
FIG. 5A is a light distribution curve, using Cartesian coordinates, of the illumination device of the instant disclosure under the first state.
Figure 5B:
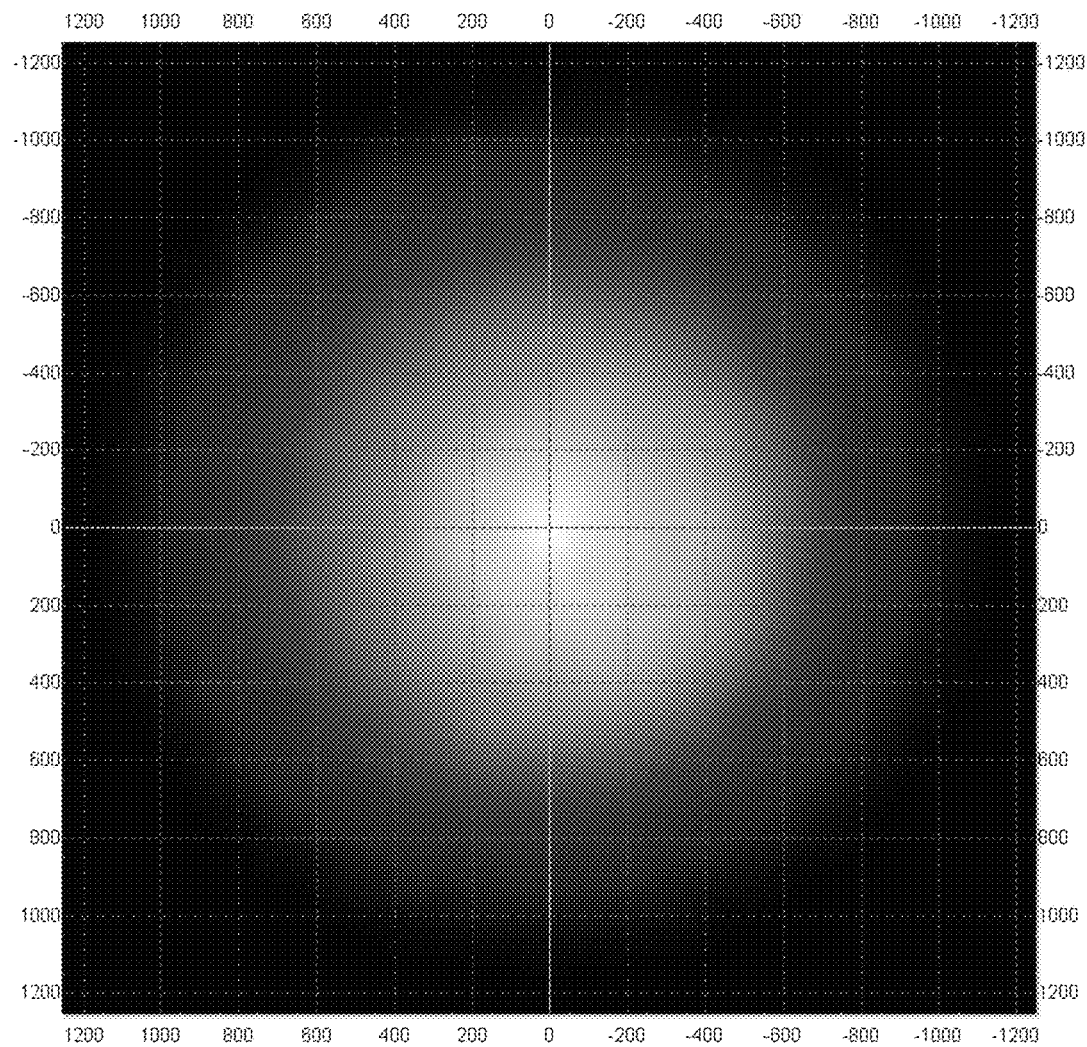
FIG. 5B is a light pattern under the first state.
Figure 6A:
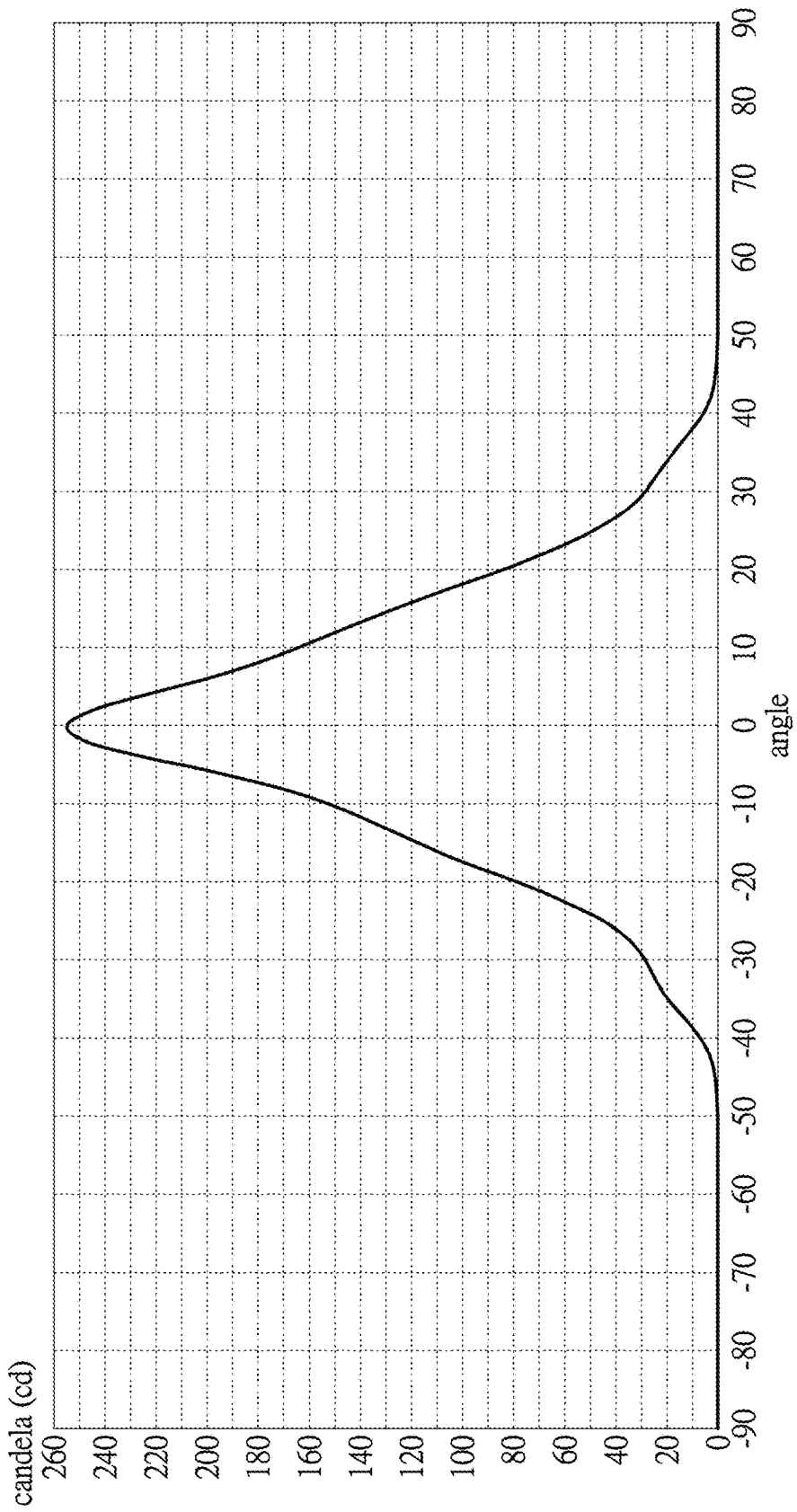
FIG. 6A is a light distribution curve, using Cartesian coordinates, of the illumination device of the instant disclosure under the second state.
Figure 6B:
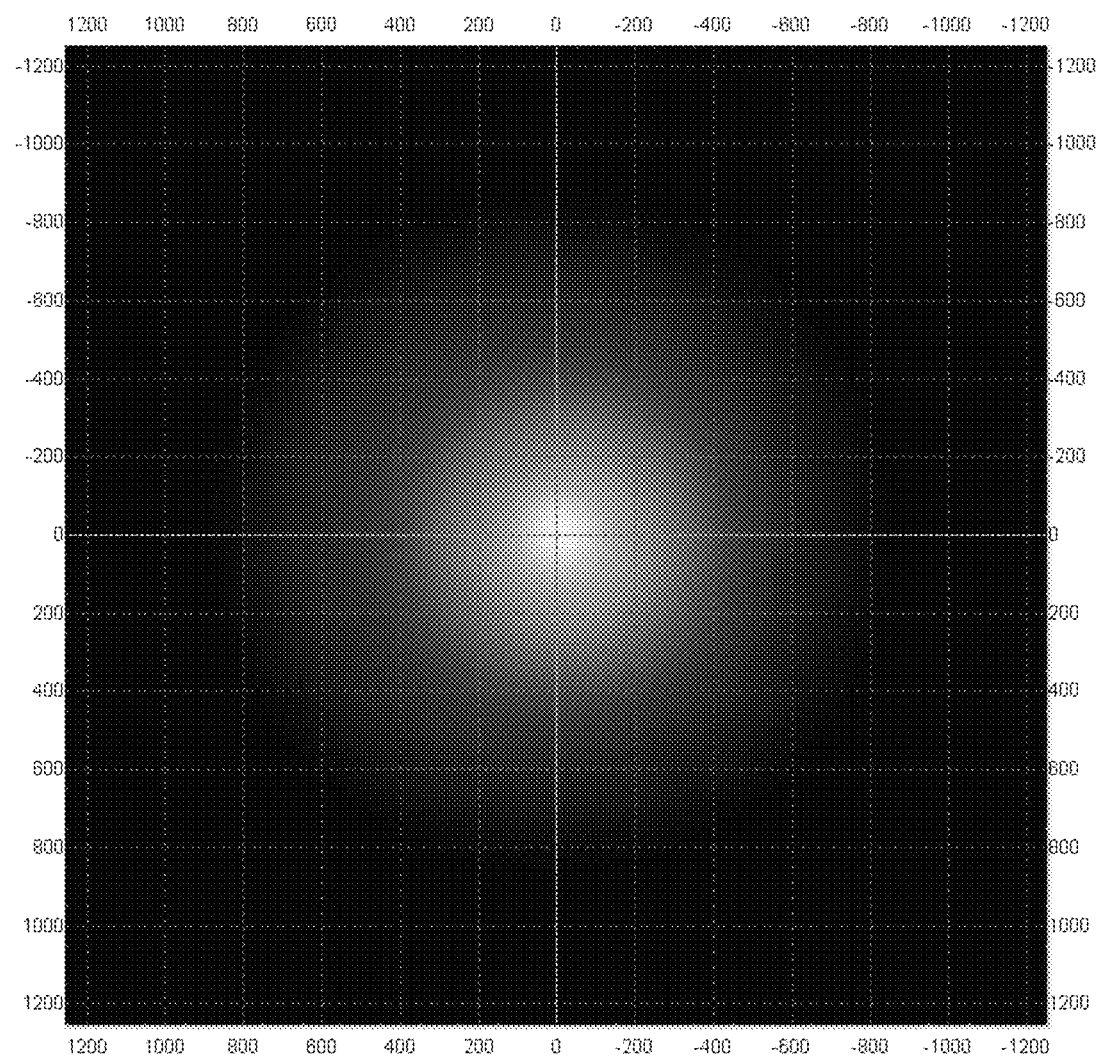
FIG. 6B is a light pattern under the second state.
Figure 7A:
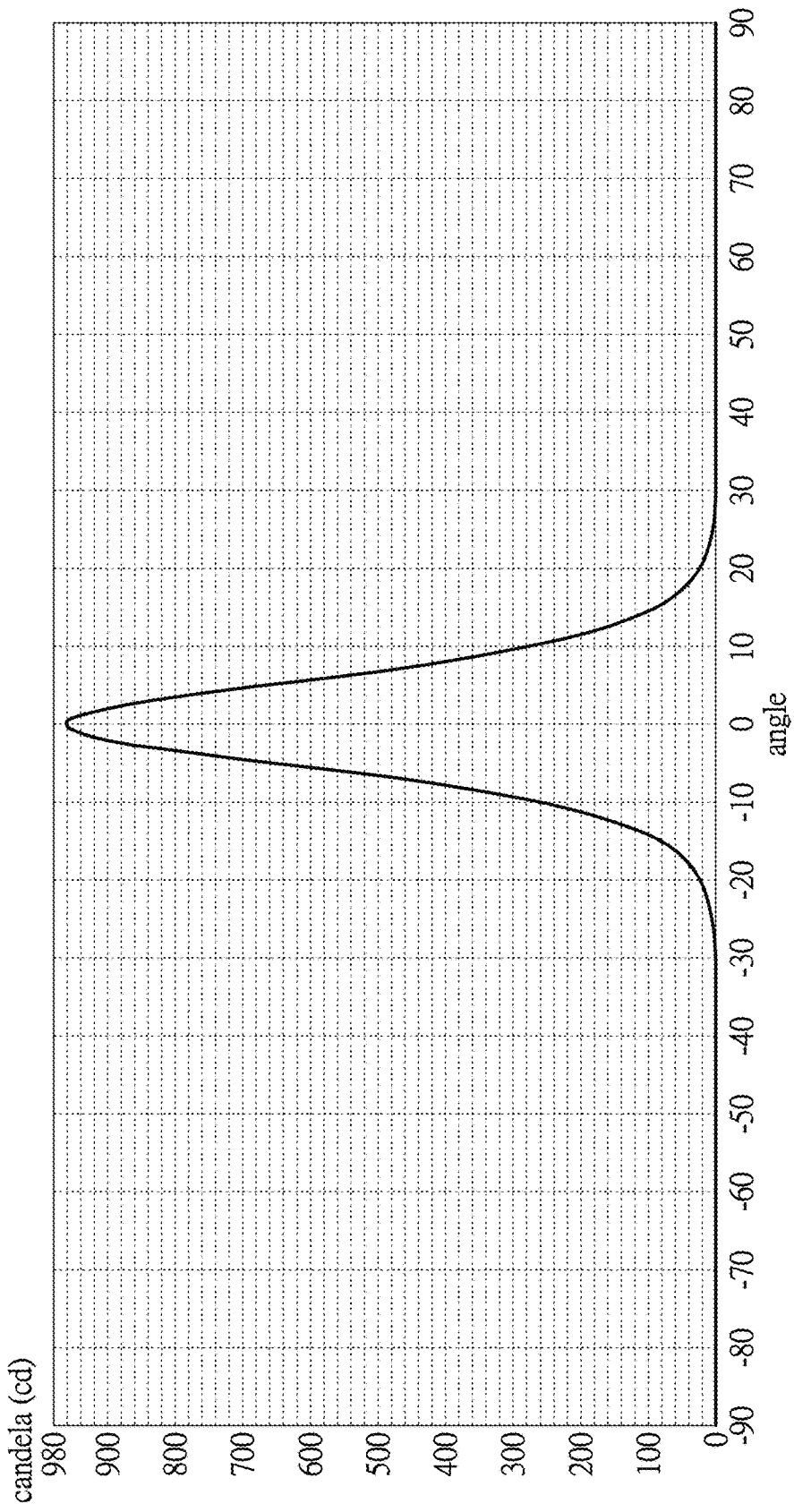
FIG. 7A is a light distribution curve, using Cartesian coordinates of the illumination device of the instant disclosure under the third state.
Figure 7B:
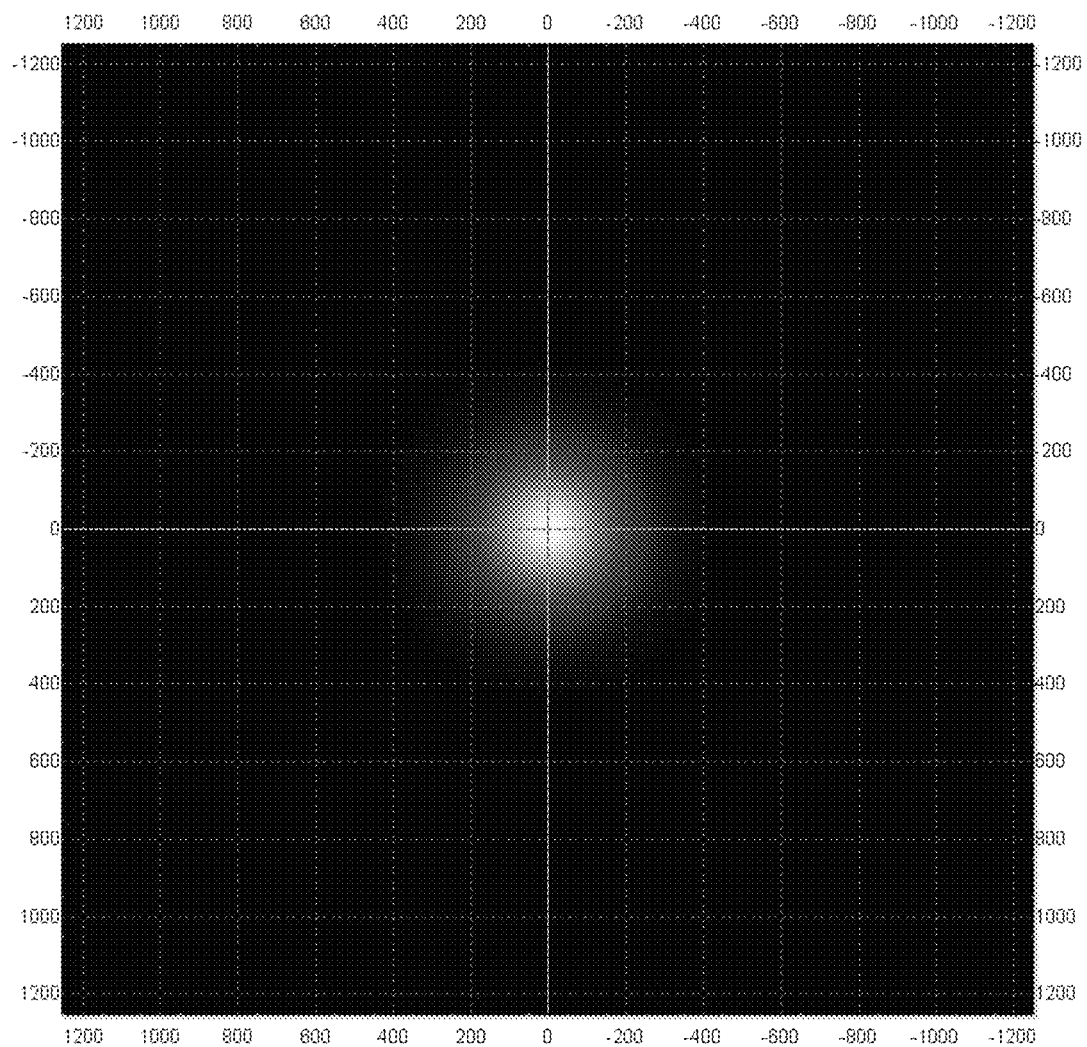
FIG. 7B is a light pattern under the third state.

Please refer to FIG. 5, FIG. 5A, FIG. 5B, FIG. 6, FIG. 6A, FIG. 6B, FIG. 7, FIG. 7A and FIG. 7B. FIG. 5A, FIG. 6A and FIG. 7A are light distribution curves, using Cartesian coordinates, of the illumination device of the instant disclosure under the first state, the second state and the third state respectively, and FIG. 5B, FIG. 6B and FIG. 7B are the light patterns corresponding to FIG. 5, FIG. 6 and FIG. 7 respectively. As shown in the figures, when the user moves the outer lens 20 apart from the inner lens 10, the size of the light pattern produced by the illumination device decreases and the central intensity of the light pattern increases. In contrast thereto, when the user moves the outer lens 20 toward the inner lens 10, the size of the light pattern produced by the illumination device increases. Therefore, the illumination device of the instant disclosure can change the size and central intensity of the light pattern projected by the illumination device by adjusting the distance between the outer lens 20 and the inner lens 10.

Figure 8:
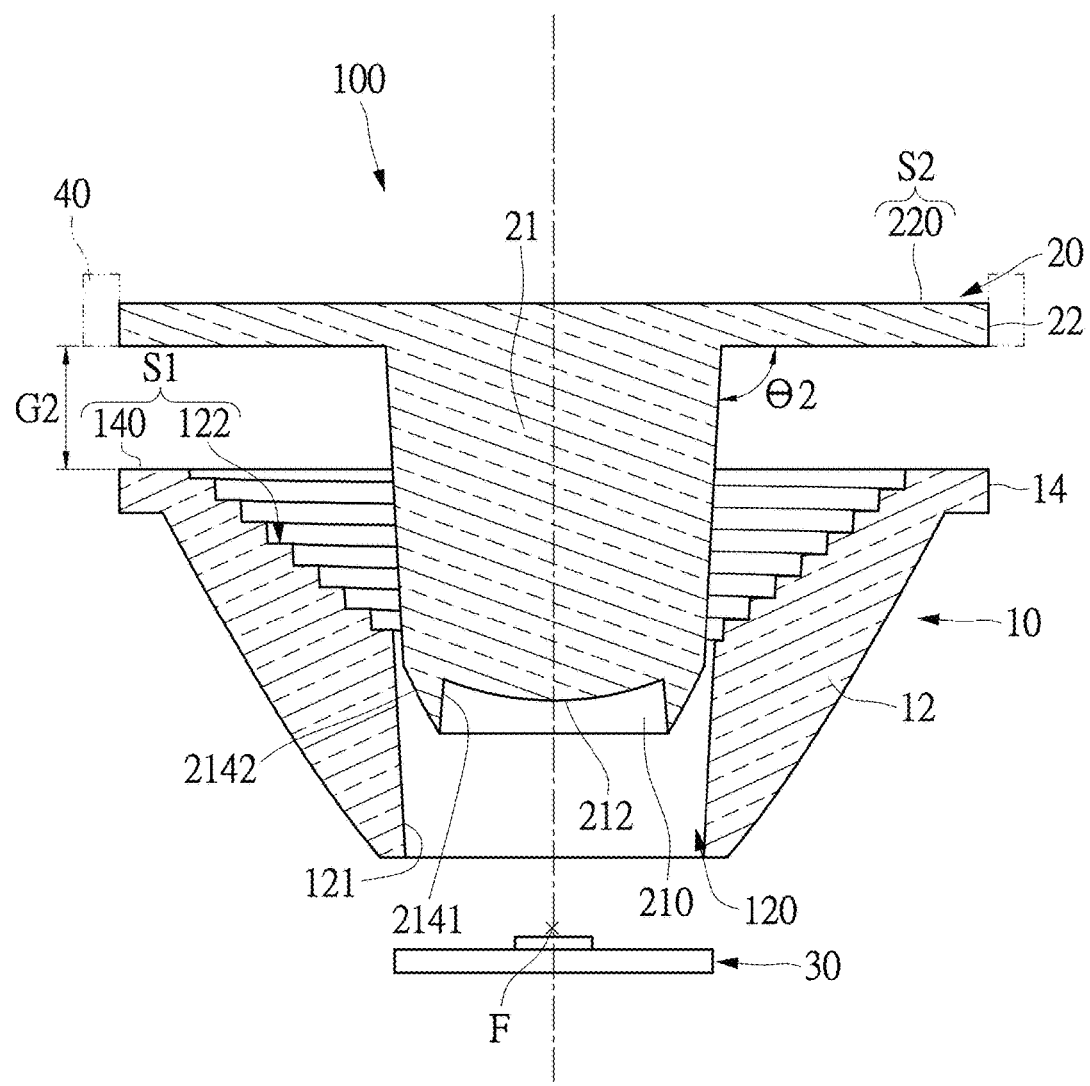
FIG. 8 is a schematic view of the illumination device of another embodiment of the instant disclosure.

Please refer to FIG. 8 and FIG. 3. FIG. 8 is a schematic view of the illumination device of another embodiment of the instant disclosure. The included angle θ1 between the light guiding column 21 and the outer light emission portion 22 can be a right angle (as shown in FIG. 3), and the included angle θ2 between the light guiding column 21 and the outer light emission portion 22 can be an angle larger than 90 degrees (as shown in FIG. 8). In addition, the side wall can be modified based on different light guiding columns 21 having different shapes.

In summary, the effectiveness of the instant disclosure is that the illumination device and the optical lens assembly thereof enable the user to change the illumination light pattern produced by the illumination device by adjusting the distance between the outer lens and the inner lens (optical component).

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. An optical lens assembly, comprising:
   an inner lens having a reflector, the reflector having a light emission portion and a light incidence portion, and an accommodating space is formed in the reflector and adjacent to the light incidence portion; and
   an outer lens having a light guiding column and an outer light emission portion connected to a top end of the light guiding column, the outer lens being disposed at a side of the inner lens, wherein the light guiding column corresponds to the accommodating space and is disposed in the accommodating space, and the outer light emission portion corresponds to the light emission portion and covers the light emission portion;
   wherein the outer light emission portion is disc-shaped, the light guiding column is a cylindrical column or a truncated cone, a bottom end of the light guiding column is concaved to form a light condensing groove, the light condensing groove has a side wall defined as a circular portion, and the circular portion has a total reflection surface configured to reflect light entering the circular portion to the outer light emission portion;
   wherein the outer lens and the inner lens are configured to move toward or move away from each other, and the light guiding column is configured to move relative to the inner lens in the accommodating space.

2. The optical lens assembly according to claim 1, wherein an outer surface of the reflector forms a total reflection surface for reflecting light from the light incidence portion to the light emission portion, the light emission portion comprises an inner light emission portion and a circular light emission portion extended from the inner light emission portion, the inner light emission portion is step-shaped.

3. The optical lens assembly according to claim 2, wherein the inner light emission portion extends spirally upwardly or downwardly.

4. The optical lens assembly according to claim 1, wherein the circular portion has an outer wall surface and an inner wall surface, the outer wall surface converges toward the bottom end of the light guiding column and the outer wall surface is the total reflection surface, the inner wall surface is parallel to the light guiding column or an included angle is defined between the inner wall surface and the light guiding column.

5. The optical lens assembly according to claim 1, wherein a top end of the light guiding column is connected to the center of a bottom surface of the outer light emission portion.

6. An optical lens assembly, comprising:
   an optical component having a reflector, the reflector having a light emission portion and a light incidence portion, and an accommodating space is formed in the reflector and adjacent to the light incidence portion; and
   an outer lens having a light guiding column and an outer light emission portion connected to a top end of the guiding column, the outer lens being disposed at a side of the optical component, wherein the light guiding column corresponds to the accommodating space and is disposed in the accommodating space, and the outer light emission portion corresponds to the light emission portion and covers the light emission portion;
   wherein the outer light emission portion is disc-shaped, the light guiding column is a cylindrical column or a truncated cone, a bottom end of the light guiding column is concaved to form a light condensing groove, the light condensing groove has a side wall defined as a circular portion, and the circular portion has a total reflection surface configured to reflect light entering the circular portion to the outer light emission portion;
   wherein the outer lens and the optical component are configured to move toward or move away from each other, and the light guiding column is configured to move relative to the optical component in the accommodating space.

7. An illumination device, comprising:
   an inner lens having a reflector, the reflector having a light emission portion and a light incidence portion, and an accommodating space is formed in the reflector and adjacent to the light incidence portion;

an outer lens having a light guiding column and an outer light emission portion connected to a top end of the guiding column, the outer lens being disposed at a side of the inner lens, wherein the light guiding column corresponds to the accommodating space and is disposed in the accommodating space, and the outer light emission portion corresponds to the light emission portion and covers the light emission portion; wherein the outer lens and the inner lens are configured to move toward or move away from each other, and the light guiding column is configured to move relative to the inner lens in the accommodating space;

wherein the outer light emission portion is disc-shaped, the light guiding column is a cylindrical column or a truncated cone, a bottom end of the light guiding column is concaved to form a light condensing groove, the light condensing groove has a side wall defined as a circular portion, and the circular portion has a total reflection surface configured to reflect light entering the circular portion to the outer light emission portion;

a light source disposed adjacent to the light incident portion; and a driving device configured to move the outer lens for changing a distance between the outer lens and the inner lens.

8. The illumination device according to claim 7, wherein an outer surface of the reflector forms a total reflection surface for reflecting light from the light incidence portion to the light emission portion, the light emission portion comprises an inner light emission portion and a circular light emission portion extends outwardly from the inner light emission portion, the inner light emission portion is step-shaped.

9. The illumination device according to claim 8, wherein the inner light emission portion extends spirally upwardly or downwardly.

10. The illumination device according to claim 7, wherein the circular portion has an outer wall surface and an inner wall surface, the outer wall surface converges toward the bottom end of the light guiding column, the outer wall surface is the total reflection surface, the inner wall surface is parallel to the direction of the light guiding column or an included angle is defined between the inner wall surface and the guiding column.

11. The illumination device according to claim 7, wherein a bottom wall of the light condensing groove is a convex portion and the light source does not correspond to a focus point of the convex portion.

12. The illumination device according to claim 7, wherein a top end of the light guiding column is connected to a center of the bottom surface of the outer light emission portion.

13. An illumination device, comprising:

an optical component having a reflector, the reflector having a light emission portion and a light incidence portion, and an accommodating space is formed in the reflector and adjacent to the light incidence portion;

an outer lens having a light guiding column and an outer light emission portion connected to a top end of the light guiding column, the outer lens being disposed at a side of the optical component, wherein the light guiding column corresponds to the accommodating space and is disposed in the accommodating space, and the outer light emission portion corresponds to the light emission portion and covers the light emission portion; wherein the outer lens and the optical component are configured to move toward or move away from each other, and the light guiding column is configured to move relative to the optical component in the accommodating space;

wherein the outer light emission portion is disc-shaped, the light guiding column is a cylindrical column or a truncated cone, a bottom end of the light guiding column is concaved to form a light condensing groove, the light condensing groove has a side wall defined as a circular portion, and the circular portion has a total reflection surface configured to reflect light entering the circular portion to the outer light emission portion;

a light source disposed adjacent to the light incidence portion; and a driving device configured to move the outer lens for changing a distance between the outer lens and the optical component.

* * * * *